United States Patent Office 3,350,354
Patented Oct. 31, 1967

3,350,354
POLYMERIC POLYESTERS OF m-TERPHENYL-4,4-DICARBOXYLIC ACID
William H. Watson, Grifton, N.C., assignor to E. I. du Pont de Nemours and Company, Wilmington, Del., a corporation of Delaware
No Drawing. Filed Nov. 22, 1966, Ser. No. 596,074
9 Claims. (Cl. 260—47)

This application is a continuation-in-part of U.S. application Ser. No. 143,585 filed Oct. 9, 1961.

This invention relates to novel highly polymeric linear polyesters which are fiber-forming and crystalline, exhibit the property of cold drawing, and can be converted into oriented fibers and films by the usual melt spinning and drawing procedures.

Synthetic linear polyesters are widely known and have become commercially important as articles of commerce in the form of fibers and films. Many varieties of polyesters and methods for their preparation have been described, for example, in U.S. 2,012,267, U.S. 2,017,250, U.S. 2,035,578, U.S. 2,465,319, U.S. 2,465,150, U.S. 2,595,343 and U.S. 2,901,466.

In addition to the good abrasion resistance, high strength and toughness, and low moisture absorption of various articles prepared from certain of these polyesters, excellent performance has been obtained when these polyesters have been shaped into fibers and fabricated into textile fabrics. One outstanding result of the use of polyester fibers in textile fabrics has been the commercial success of "wash-and-wear" garments prepared from such fibers. The search for additional synthetic linear condensation polyesters capable of forming fibers useful in the preparation of wash-and-wear garments has revealed that good performance may be correlated with high recovery properties in the fibers, and that recovery properties improve as the concentration of ring structures in the polymer molecule increases. It would appear that a stiffer polymer molecule is necessary for higher recovery properties, and that an increased concentration of ring structures provides a stiffer molecule.

Another important factor affecting wrinkle resistance and crease retention under "warm-wet" conditions, most important in wash-and-wear garments, is the glass transition temperature, Tg, described in U.S. 2,556,295. A glass transition temperature above 80° C. is a necessity for synthetic fibers to be useful in wash-and-wear garments, and polymers having even higher values of Tg are preferred. The polymers of this invention are outstanding in this respect. High glass transition temperatures also result in better retention of physical properties at temperatures approaching the melting point of the polymer.

It is an object of this invention to provide a novel class of synthetic linear condensation polyesters. A further object is the provision of a new class of polyesters useful in the formation of fibers, films, molded articles, and the like. A still further object is the provision of novel polyester fibers having good recovery properties. Other objects will become apparent from the following description of the invention.

These objects are accomplished in accordance with this invention by the polycondensation of ester-forming monomers containing as a major component m-terphenyl-4,4″-dicarboxylic acid or ester-forming derivatives thereof.

Thus there is provided by this invention a synthetic linear condensation polyester composition comprising recurring units having the structural formula:

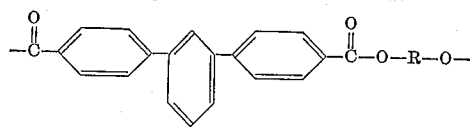

wherein R is a divalent organic radical composed primarily of carbon and hydrogen.

The term "synthetic linear condensation polyester," as used herein, comprehends a substantially linear polymer of fiber-forming molecular weight comprising a series of predominantly carbon atom chains joined by recurring carbonyloxy radicals,

As used herein, the term "polyester" is intended to include copolyesters, terpolyesters, and the like. Polyesters having an intrinsic viscosity of at least about 0.3 are considered to be of fiber-forming molecular weight.

The polyesters of this invention are prepared from a dihydroxy compound having the formula HO—R—OH, or an ester-forming derivative thereof, in which —R— is a divalent organic radical composed primarily of carbon and hydrogen. Preferably, —R— is a hydrocarbon of the group consisting of alkylene, cycloalkylene, arylene and aralkylene radicals of from 2 to 20 carbon atoms. Thus, HO—R—OH may be a glycol or a diphenol. Suitable glycols for the preparation of the polyesters of this invention include the glycols from the series $$HO(CH_2)_nOH$$

where $n$ is an integer from 2 to 10, such as ethylene glycol, butylene glycol, hexamethylene glycol, decamethylene glycol, and the like. Other suitable glycols include hexahydro-p-xylylene glycol, 2,2-dimethylpropylene glycol, and quinitol. Suitable diphenols include p,p′-diphenylolmethane, bis(p-hydroxyphenyl)ether, 2,2-bis-(3 - methyl - 4 - hydroxyphenyl)propane, bis(p - hydroxyphenyl)sulfone, 4,4′ - dihydroxy - 3,3′ - dimethylbiphenyl, hydroquinone, and the like. Other suitable dihydroxy compounds for the preparation of polyesters are disclosed in U.S. 2,831,831, U.S. 2,831,832, U.S. 2,808,390, U.S. 2,799,666, U.S. 2,789,972, U.S. 2,901,466, and U.S. 2,035,578.

The term "ester-forming group," as used herein, refers to either of the complementary radicals, hydroxy carbonyl and hydroxyl

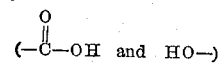

which react with the elimination of water to form a carbonyloxy ester radical

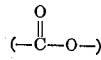

The term also includes functional groups equivalent to the hydroxyl group, such as epoxides or esters, particularly the acetate ester or esters of other aliphatic acids having relatively few carbon atoms, as well as functional groups equivalent to the hydroxy carbonyl group, such as carbonyl halides, anhydrides, salts, and esters with the lower alcohols. Similarly, compounds containing ester-forming groups are designated as "ester-forming compounds." Of course, each of the complementary hydroxy carbonyl and hydroxyl radicals, or functional groups derived from them, must be present in the reaction mixture for polycondensation to proceed; and any excess of one of the complementary groups with respect to the other is removed during the reaction, usually by volatilization of compounds containing such groups. Glycol esters (hydroxyalkyl esters) of dicarboxylic acids may function in either capacity as ester-forming compounds and thereby function as intermediates from which polycondensation can be initiated directly.

The preferred embodiment of the invention comprises a polyester of acid and glycol components in which the acid component consists essentially of at least about 20 mol percent of m-terphenyl-4,4''-dicarboxylic acid and from 0% to 80% of p-terphenyl-4,4''-dicarboxylic acid or bibenzoic acid. By "acid component" of the polyester is meant the sum of all the carboxylic acids which would be formed by hydrolysis of the carbonyloxy linkages in the polyester chain. Instead of p-terphenyl-4,4''-dicarboxylic acid or bibenzoic acid, the acid component of copolyesters may comprise other carboxylic acids which include terephthalic acid, isophthalic acid, 4,4'-sulfonyldibenzoic acid, 4,4'-benzophenone dicarboxylic acid, 1,2-bis(4-carboxyphenyl)ethane, bis-4-carboxyphenyl ether, 4-(2-hydroxyethyl)benzoic acid, and 4-(2-hydroxyethoxy) benzoic acid. Other examples include adipic acid, sebacic acid, hexahydroterephthalic acid, and similar compounds.

The linear condensation polyesters of this invention may be conveniently prepared by the ester interchange reaction described in U.S. 2,465,319. In this reaction, a glycol is reacted with a low molecular weight alkyl ester of m-terphenyl-4,4''-dicarboxylic acid. The dimethyl ester is conveniently used. In carrying out the ester interchange reaction, at least one molecular proportion of the glycol per molecular proportion of the terphenyl-4,4''-dicarboxylate should be used, greater proportions being preferred.

In the ester interchange reaction, it is desirable to use an ester of m-terphenyl-4,4''-dicarboxylic acid formed from an alcohol or phenol with a boiling point sufficiently below that of the glycol to be used so that the former can be easily removed from the reaction zone by distillation. It is preferred to use the methyl or ethyl esters as these esters are formed from alcohols which, because of their relatively low boiling points, are easily separated by distillation from the glycol to be used for this invention. Heating should be above the melting point of the reaction mixture and above the boiling point of the alcohol or phenol to be displaced, but not substantially above the boiling point of the glycol, although temperatures as high as 25° C. above the boiling point of the glycol may be used to hasten completion of the reaction. Heating should be effected under conditions such that the displaced alcohol or phenol can be removed from the reaction zone, usually by means of conventional distillation equipment. The heating is usually at atmospheric pressures, but higher or lower pressures may be used if desired.

The ester interchange reaction is advantageously carried out in the presence of ester interchange catalysts. Many such ester interchange catalysts have been disclosed in recent literature. Suitable catalysts include manganous acetate, calcium acetate, litharge, sodium methoxide, and sodium hydrogen hexabutoxytitanate.

Following the ester interchange reaction, heating is continued under reduced pressure until excess dihydroxy compound is removed and the polymerization reaction has proceeded to the desired degree. The final stages of the polymerization may be carried out with the polymer in the molten state, or if desired, the reaction may be completed by solid phase polymerization. The polymerization reaction may be carried out in the presence of catalysts such as antimony trioxide, tetraisopropyltitanate, litharge, and zinc acetate.

Alternatively, the highly polymeric polyesters of this invention can be made by reacting suitable dihydroxy compounds with other ester-forming derivatives of m-terphenyl-4,4''-dicarboxylic acid, e.g., the diacid chloride. The preparation of polyesters from diacid chlorides is fully described in U.S. 2,035,578.

To those skilled in the art, other methods of preparation will come readily to mind. For example, m-terphenyl-4,4''-dicarboxylic acid may be heated with the diacetate of a diphenol or with a mixture of a diphenol and acetic anhydride in a manner similar to that described in U.S. 2,595,343.

The polyesters of this invention are characterized by low moisture sensitivity, insolubility in common organic liquids, good color, toughness, and high strength. In addition, the polymers have good resistance to discoloration upon exposure to heat and to ultraviolet light, and excellent resistance to hydrolytic degradation upon exposure to alkaline solutions. The polymers are readily formed into useful structures such as fibers and films by known techniques; for example, the polymers may be melt spun into fibers or, alternatively, the polymers may be dissolved in an appropriate solvent and cast into a film or dry spun to give textile fibers. The fibers may be drawn and heat set employing techniques that are described in the prior art.

Polyesters from m-terphenyl-4,4''-dicarboxylic acid do not have as high a melting point as might have been expected from polymers having such a high concentration of rings in the polymer molecule, and may be easily melt spun or melt extruded using conventional equipment and procedures. The moderately high melting temperatures of the polymers prepared from the m-isomer are in contrast to the extremely high melting temperatures of polyesters prepared from p-terphenyl-4,4''-dicarboxylic acid. Surprisingly, however, the polyesters exhibit a high glass transition temperature. The polyesters illustrated in the examples have glass transition temperatures higher than 100° C.

m-Terphenyl-4,4''-dicarboxylic acid, previously unknown in the chemical literature, may be prepared according to the following procedure. 4,4''-diacetyl-m-terphenyl is prepared from commercially available m-terphenyl by a Friedel-Crafts reaction according to the procedure of Goodman and Lowy, described in J. Am. Chem. Soc. 60, 2155 (1938). The diacetyl compound is converted to the acid as follows: A solution of about 7 mols of potassium hypochlorite in 3 liters of water is heated to 60–65° C. and 0.5 mol of 4,4''-diacetyl-m-terphenyl dissolved in about 1000 ml. dioxane is added portionwise while maintaining the temperature between 65 and 75° C. by alternately heating and cooling the mixture. After all of the diacetyl compound is added, the mixture is stirred at 65–75° C. until the diacetyl compound is completely dissolved. The excess potassium hypochlorite is then destroyed by the cautious addition of acetone. The solution is treated with charcoal, clarified by filtration, and then heated to 95° C. The hot solution is acidified with excess glacial acetic acid, cooled to room temperature and the precipitated m-terphenyl-4,4''-dicarboxylic acid collected. The acid is further purified by dissolution in an alkaline aqueous solution, treatment with charcoal, filtration, and reprecipitation by acetic acid from hot solution. The precipitated acid is collected and dried. The acid thus prepared is found by titration to have an equivalent weight of 156, compared with a calculated equivalent weight of 159. The acid is converted by esterification with methanol to the dimethyl ester which is found to have a melting point of 193–194° C. The saponification equivalent weight of the ester is found to be 178 compared with a calculated value of 173. The ester is analyzed for carbon and hydrogen and found to consist of 76.2% carbon and 5.4% hydrogen, compared with calculated values of 76.2 and 5.2, respectively.

In addition to its usefulness in the preparation of polyesters for the production of fibers and films, m-terphenyl- 4,4″-dicarboxylic acid is also useful as an intermediate in the manufacture of dyes and fine chemicals.

Fibers prepared from the polyesters of this invention are found to have excellent recovery properties. Fabrics prepared from these fibers are wrinkle resistant, have excellent crease recovery, and in garments require little or no ironing for maintenance of neat appearance. These properties result from the excellent recovery properties of the fibers themselves, a characteristic which appears to be inherent in the structure of polyesters prepared from m-terphenyl-4,4″-dicarboxylic acid. Fabrics prepared from the fibers of this invention perform exceptionally well in standard tests for wash-and-wear garments.

The term "intrinsic viscosity," as used herein, is defined as the limit of the fraction $$\ln(r)/c$$

as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

This invention can be further illustrated by the following examples of preferred embodiments, although it will be understood that these examples are included merely for the purposes of illustration and are not intended to limit the scope of the invention unless otherwise specifically indicated.

In the examples "crystalline melting point" refers to the temperature at which the last trace of birefringence disappears when a sample of polymer is heated slowly on the hot stage of a microscope between crossed Nichol prisms. "Polymer melting temperature" refers to the gross melting temperature determined by heating a polymer sample slowly and observing the lowest temperature at which light pressure causes permanent deformation of the sample.

Example I

A reaction vessel is charged with 17.3 grams (0.05 mol) of the dimethyl ester of m-terphenyl-4,4″-dicarboxylic acid, 15.9 grams (0.11 mol) trans-hexahydro-p-xylylene glycol, and, as a catalyst, 0.4 ml. of a solution of $NaHTi(OBu)_6$. The $NaHTi(OBu)_6$ is prepared by dissolving one gram of sodium metal and 14.8 grams titanium tetrabutoxide in sufficient butanol to give 200 ml. of solution. The polymerization reaction vessel is then placed in a heating bath and the temperature raised and the pressure reduced according to the following cycle:

| Time (Minutes) | Temperature (° C.) | Pressure (mm. Hg) |
| --- | --- | --- |
| 50 | 200 | 760 |
| 20 | 215 | 760 |
| 15 | 225 | 760 |
| 15 | 255 | 760 |
| 5 | 255 | 507 |
| 5 | 255 | 252 |
| 5 | 255 | 125 |
| 5 | 255 | 49 |
| 140 | 255 | 0.7 |
| 70 | 295 | 0.7 |
| 35 | 325 | 0.7 |

The reaction product is a clear liquid which cools to a white opaque solid. Fibers can be drawn from the melt. These fibers are strong and flexible, and can be cold drawn. The polymeric product is found to have an intrinsic viscosity of 0.57 and a crystalline melting point of 290° C. The glass transition temperature is 141° C.

Example II 0.1 mol of the dimethyl ester of m-terphenyl-4,4″-dicarboxylic acid is mixed with 0.22 mol of ethylene glycol and a catalytic amount of $Mn(OAc)_2 \cdot 4H_2O$ and $Sb_2O_3$ added. The mixture is heated at atmospheric pressure until no more methanol is distilled out, and then the temperature is gradually raised to 285° C. while the pressure is reduced to about 1 mm. and held there for 210 minutes until excess glycol is removed and polymerization is completed. The resulting polymer is found to have an intrinsic viscosity of 0.56, a polymer melting temperature of 160° C., and a glass transition temperature of 130° C.

A portion of the polymer is melt pressed into a film using a press temperature of 220° C. The resulting film is found to be clear, flexible, and tough.

A second portion of the polymer is melt spun at 220° C. and subsequently drawn into a fiber having a tenacity of 1.2 g.p.d., a break elongation of 54%, and an initial modulus of 27 g.p.d., measured after boil-off. Measurement of tensile strain recovery gives a TSR value of 77%. This TSR value is considerably higher than the TSR value of 65% given by commercial fibers of polyethylene terephthalate in the same test.

The ability of a fiber to recover from low levels of extension as in the TSR test has been found to correlate well with the wash-and-wear performance of fabrics prepared from that fiber. In the TSR test, a 10-inch sample of a yarn or monofilament is mounted on an Instron Tensile Testing Machine and held in a slack condition for 2 minutes while immersed in a water bath maintained at a temperature of 40° C. The yarn sample is then stretched, still immersed in the water bath, at an elongation rate of 1 inch per minute. Upon reaching the desired elongation, the sample is held at constant length for an additional 2 minutes, at which time the water bath is removed. The load on the fiber is then reduced to a value of 0.042 gram per denier and the fiber is allowed to retract for 2 minutes. The final length of the sample is measured under zero load. Percent recovery is calculated from the formula:

$$\frac{\text{units of retraction}}{\text{units of elongation}} \times 100$$

This procedure is carried out for elongations of 0.5, 1, 2, and 3%, and a graph is prepared by plotting the percent recovery against total elongation for the range 0–3%. TSR values are average percent recovery values from the range 0–3% elongation which may be determined from the graph by usual graphical averaging procedures.

Example III

A polymerization reaction vessel is charged with 0.50 mol of the dimethyl ester of m-terphenyl-4,4″-dicarboxylic acid and 1.10 mols of 2,2-dimethylpropylene glycol. 4 ml. of a 7% solution of $NaHTi(OBu)_6$ in butanol is added as a catalyst. The vessel is swept with nitrogen until free of oxygen and then heated to effect ester interchange. Methanol is removed by distillation. The pressure in the vessel is reduced to about 1 mm. over a period of 25 minutes and then the temperature is raised to 295° C. for 230 minutes to complete the polymerization reaction. The polymeric product is a clear liquid which cools to a white opaque solid. Fibers may be drawn from the molten polymer. The product is found to have a polymer melting temperature of 142° C.

Example IV

A polyester is prepared from tetramethylene glycol and the dimethyl ester of m-terphenyl-4,4″-dicarboxylic acid according to the general procedure of Example III. The resulting polymer is crystallized by soaking it in methylene chloride, and is then found to have a crystalline melting point of 208° C. The glass transition temperature is found to be 110° C.

The polymer is melt pressed into a film which is found to be flexible and tough, and to be resistant to hydrolysis by alkaline solutions.

*Example V*

The procedure of Example III is repeated using hexamethylene glycol in place of dimethylpropylene glycol. The polyester produced is found to have a crystalline melting point of 182° C. Filaments may be pulled from the molten polymer, and may be cold drawn to give oriented fibers of good strength.

*Example VI*

A polymerization vessel is charged with a mixture of dimethylbibenzoate and dimethyl-m-terphenyl-4,4''-dicarboxylate in a molar ratio of 2:1, along with a molar excess of ethylene glycol and an ester interchange catalyst. The mixture is heated to effect ester interchange, with methanol being removed by distillation. The pressure in the vessel is then reduced to about 1 mm. and heating continued until the desired degree of polymerization is achieved. The polymeric product is found to have an intrinsic viscosity of 0.55 and a polymer melting temperature of 233° C. The glass transition temperature of the polymer is found to be 119° C.

A portion of the polymer is melt spun into filaments which are found to be capable of being cold drawn, giving strong, flexible fibers. These fibers exhibit good light and heat stability as well as excellent retention of physical properties during and after exposure to elevated temperatures.

*Example VII*

The procedure of Example VI is repeated using a 3:1 mol ratio of dimethylbibenzoate to dimethyl-m-terphenyl-dicarboxylate. The final polymerization stage is carried out at a temperature of 325° C. The resulting polyester is found to have a polymer melting temperature of 285° C. and a crystalline melting point of 323° C. The glass transition temperature, $Tg$, of the polymer is found to be 120° C.

The polymer prepared above is found to be insoluble in carbon tetrachloride and tetrachloroethylene, as well as the common solvents water, methanol, ethanol, hexane, cyclohexane, benzene, toluene, xylene, ether, tetrahydrofuran, methyl acetate, ethyl acetate, and the like.

The polymer is melt spun at 345° C. to give a 5 filament yarn which is subsequently drawn over a hot pin at 160° C. Measurement of the tensile properties of the yarn after boil-off yielded values of 1.8 g.p.d. for tenacity, 20% for elongation at break, and 67 g.p.d. for the initial modulus. In laboratory tests for tensile recovery properties as in Example II, the yarn gives a TSR value of 77%, which is considered excellent.

*Example VIII*

A 70 denier, 34 filament yarn is prepared from the polyester of m-terphenyl-4,4''-dicarboxylic acid and trans-hexahydro-p-xylylene glycol using conventional melt spinning procedures. The yarn is woven into a fabric having a 126 x 80 plain weave construction with 7 turns twist in the warp and 2 turns twist in the filling in finished form. The fabric is heat set at a temperature of 190° C.

The fabric is tested for wash-wear performance as follows: A one-square-yard fabric sample is washed in an automatic washing machine using water at 40° C. with a commercially-available detergent for home laundry use, rinsed in water at 40° C., and then tumbled dry in an automatic dryer at 70° C. After several successive washing and drying cycles, the appearance of the fabric is rated 3.7 on a scale where 1.0 represents severe wrinkling and 5.0 represents no wrinkling. In this same test, a fabric prepared from 100% polyethylene terephthalate fiber is given a rating of 2.5.

*Example IX*

A reaction vessel is charged with 3 parts ethylene glycol and 1 part of a 75/25 molar mixture of the dimethyl ester of m-terphenyl-4,4''-dicarboxylic acid and the dimethyl ester of p-terphenyl-4,4''-dicarboxylic acid. A mixture of $Mn(OAc)_2 \cdot 4H_2O$ and $Sb_2O_3$ is used as a catalyst. The vessel is then heated for 2½ hours at a temperature of 200°–220° C., while methanol is removed by distillation. The temperature of the vessel is then raised to 295°–310° C. and the pressure reduced gradually to about 1.0 mm. of mercury. After about 1½ hours, a clear, liquid polymer is obtained from which fibers can be drawn. The polymeric product has an intrinsic viscosity of 0.44 and a polymer melting temperature of 200° C.

*Example X*

A mixture of cis and trans-hexahydro-p-xylylene glycol is heated with the dimethyl ester of m-terphenyl-4,4''-dicarboxylic acid and a catalytic amount of $$NaHTi(OC_4H_9)_6$$

to give a polymer having an intrinsic viscosity of 0.89, a polymer melting temperature of 250° C. and a crystalline melting point of 272° C. The polymer is melt spun and drawn to give yarn which is tested for tensile strain recovery as in Example II. A TSR value of 71% is obtained, indicating that the fiber is highly suitable as a component in wash-and-wear fabrics.

*Example XI*

Copolymer prepared as in Example VII is melt spun at 245° C., quenched in air and drawn 3.9× at 157° C. to give an 83 denier, 30 filament yarn having a tenacity of 2.7 g.p.d., a break elongation of 28%, and a boil-off shrinkage of 7%. In the tensile strain recovery test the yarn gives a TSR value of 72%. Tested for dyeability with dispersed dyes, the yarn is found to give a dyeing rate approximately twice that of polyethylene terephthalate yarn.

The yarn is twisted 7 turns per inch and woven into a plain weave fabric. When tested for caustic sensitivity by boiling for one hour in 1% NaOH solution, the fabric is found to suffer only one tenth the weight loss shown by a similarly treated polyethylene terephthalate fabric.

*Example XII*

A charge consisting of 23.34 grams of m-terphenyl-4,4''-dicarboxylic acid (1.0 part by mols), 22.70 grams of diphenylolpropane diacetate (0.99 part), 0.1 gram anhydrous sodium acetate, and 50 ml. of "Dowtherm"[1] A is placed in a reaction flask fitted with a nitrogen inlet, stirrer, distilling head, and heating bath. The apparatus is swept with nitrogen and then heated consecutively at 260° C. for 1 hour, 270° C. for 30 minutes, and 280° C. for 30 minutes, while removing acetic acid by distillation. Finally the last traces of acetic acid and "Dowtherm" A are removed by heating at 300° C. for 15 minutes at a pressure of 0.6 mm. Upon cooling, the polymeric product solidifies to an off-white crystalline material which is found to have an intrinsic viscosity of 0.49 and a melting point of 370°–375° C.

The novel polyester compositions of this invention offer many advantages including good initial color, good resistance to discoloration upon exposure to heat and to ultraviolet light, and good resistance to hydrolytic degradation upon exposure to alkaline solutions. Furthermore, shaped articles such as fibers and films prepared from these polyesters exhibit the property of good recovery from bending and tensile stress, associated with a high concentration of rings in the polymer molecule. Furthermore, many of the polyester compositions of this in-

---

[1] Dow Chemical Company's registered trademark for its eutectic mixture of diphenyl and diphenyl oxide.

vention exhibit glass transition temperatures above 100° C., an important factor in polymers designated for wash-and-wear service.

Any of the additives, fillers, pigments, finishes, and the like which are conveniently added to polyester compositions may be added to the polyesters of this invention without seriously detracting from the outstanding physical characteristics obtained.

In a particularly important embodiment, the polyesters of this invention contain as an integral part of the polymer chain 0.5 to 5.0 mol percent of a unit bearing a sulfonate salt group. For example, the polyester may contain 0.5 to 5.0 mol percent of the radical of sodium 3,5-dicarboxybenzene sulfonate. The presence of sulfonate salt groups renders the polyester dyeable with basic dyes.

Alternatively, the polyesters of this invention may be made dyeable with acid dyes by including minor amounts of a tertiary amine group in the molecular chain. For example, the polyesters may contain 0.5 to 5.0 mol percent of repeating units such as the radical of pyridine-3,5-dicarboxylic acid.

The polyesters of this invention are relatively high melting, chemically inert solids which may be used in the preparation of many types of fibers for use in the textile art. For example, the fibers may be used in the preparation of knitted, woven, nonwoven, and pile fabrics, yarns, ropes, cords, sewing thread, and may specialty fabrics. Other uses for fibers in suitable form include stuffing material for pillows and for furniture and the like, artificial hair, and bristles. In addition to fibers, the polyesters of this invention may be used in the form of film and sheet material. Typical uses are wrapping foil, leather substitute, gaskets, electrical insulation, washers, lamp shades, dry cleaning bags, belting and the like. The polyesters are also useful in coating and impregnating compositions. For example, such compositions may be used to coat paper, cloth, leather, bookbinding, and other materials. Solutions of these polyesters may be used as clear lacquers and as pigmented enamels, and are especially valuable for coating wires because of the excellent electrical properties of the polymer.

It will be apparent that many widely different embodiments of this invention may be made without departing from the spirit and scope thereof, and therefore it is not intended to be limited except as indicated in the appended claims.

I claim:

1. A linear fiber-forming condensation polyester comprising recurring units having the structural formula

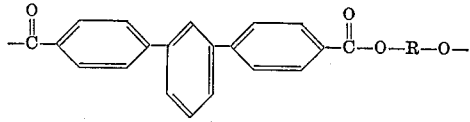

wherein R is a divalent organic radical composed primarily of carbon and hydrogen.

2. The polyester defined in claim 1 wherein R is a hydrocarbon of the group consisting of alkylene, cycloalkylene, arylene and aralkylene radicals of 2 to 20 carbon atoms.

3. The polyester defined in claim 1 wherein R is a glycol from the series $HO(CH_2)_nOH$ where $n$ is an integer from 2 to 10.

4. A linear fiber-forming condensation polyester of acid and glycol components in which the acid component consists essentially of at least 20 mol percent of m-terphenyl-4,4″-dicarboxylic acid and from 0 to 80 mol percent of p-terphenyl-4,4″-dicarboxylic acid, and the glycol component is a dihydroxy compound having the formula HO—R—OH wherein R is a divalent organic radical composed primarily of carbon and hydrogen.

5. A linear fiber-forming condensation polyester of acid and glycol components in which the acid component consists essentially of at least 20 mol percent of m-terphenyl-4,4″-dicarboxylic acid and from 0 to 80 mol percent of bibenzoic acid, and the glycol component is a dihydroxy compound having the formula HO—R—OH wherein R is a divalent organic radical composed primarily of carbon and hydrogen.

6. A linear fiber-forming condensation polyester of acid and glycol components consisting essentially of m-terphenyl-4,4″-dicarboxylic acid and hexahydro-p-xylylene glycol.

7. A linear fiber-forming condensation polyester of acid and glycol components consisting essentially of m-terphenyl-4,4″-dicarboxylic acid and ethylene glycol.

8. A linear fiber-forming condensation polyester of acid and glycol components consisting essentially of m-terphenyl-4,4″-dicarboxylic acid and tetramethylene glycol.

9. A linear fiber-forming condensation polyester of acid and glycol components consisting essentially of m-terphenyl-4,4″-dicarboxylic acid and diphenylolpropane.

References Cited

UNITED STATES PATENTS

| | | | |
|---|---|---|---|
| 1,723,167 | 8/1929 | Herz et al. | 260—515 |
| 2,290,401 | 7/1942 | Witman | 260—515 |
| 2,503,251 | 4/1950 | Edwards et al. | 18—54 |
| 2,550,661 | 5/1951 | Allen | 260—475 |
| 2,595,343 | 5/1952 | Drewitt | 260—47 |
| 2,739,957 | 3/1956 | Billica | 260—75 |
| 2,807,606 | 9/1957 | Lincoln | 260—75 |
| 2,887,468 | 5/1959 | Caldwell et al. | 260—47 |
| 2,901,466 | 8/1959 | Kibler et al. | 260—75 |

FOREIGN PATENTS

| | | |
|---|---|---|
| 219,434 | 12/1958 | Australia. |
| 828,028 | 2/1960 | Great Britain. |

OTHER REFERENCES

Ind. & Eng. Chem., vol. 51, No. 2, February 1959, pp. 147–150, article by Campbell.

J. American Chemical Society, 82, 3126–28 (1960), article by Campbell.

WILLIAM H. SHORT, *Primary Examiner.*

L. P. QUAST, *Assistant Examiner.*